(12) United States Patent
Nitzpon

(10) Patent No.: US 8,753,245 B2
(45) Date of Patent: Jun. 17, 2014

(54) WIND ENERGY PLANT

(71) Applicant: Nordex Energy GmbH, Norderstedt (DE)

(72) Inventor: Joachim Nitzpon, Hamburg (DE)

(73) Assignee: Nordex Energy GmbH, Norderstedt (DE)

( * ) Notice: Subject to any disclaimer, the term of this patent is extended or adjusted under 35 U.S.C. 154(b) by 0 days.

(21) Appl. No.: 13/853,233

(22) Filed: Mar. 29, 2013

(65) Prior Publication Data

US 2013/0231209 A1   Sep. 5, 2013

Related U.S. Application Data

(62) Division of application No. 12/041,138, filed on Mar. 3, 2008, now Pat. No. 8,409,049.

(30) Foreign Application Priority Data

Jul. 17, 2007   (DE) .......................... 10 2007 033 806

(51) Int. Cl.
*F16H 57/08*   (2006.01)

(52) U.S. Cl.
USPC ........................................................ 475/331

(58) Field of Classification Search
USPC ........................................................ 475/331
See application file for complete search history.

(56) References Cited

U.S. PATENT DOCUMENTS

| | | | |
|---|---|---|---|
| 4,020,716 A | | 5/1977 | Toth et al. |
| 4,091,688 A | * | 5/1978 | Huffman ........................ 475/331 |
| 4,601,592 A | | 7/1986 | Jatczak et al. |
| 4,611,505 A | | 9/1986 | Cronin et al. |
| 7,059,996 B2 | * | 6/2006 | Shirokoshi ..................... 475/347 |
| 8,409,049 B2 | | 4/2013 | Nitzpon |

FOREIGN PATENT DOCUMENTS

| | | |
|---|---|---|
| CN | 101191532 | 6/2008 |
| DE | 19916453 | 10/2000 |
| DE | 19916454 | 10/2000 |
| DE | 10242707 | 4/2004 |
| DE | 10318945 | 10/2004 |
| DE | 10357026 | 6/2005 |
| EP | 0792415 | 9/1997 |
| EP | 1553315 | 7/2005 |
| JP | 2006207623 | 8/2006 |

* cited by examiner

*Primary Examiner* — Ha D Ho
(74) *Attorney, Agent, or Firm* — Vidas, Arrett & Steinkraus

(57) ABSTRACT

A wind energy plant comprising a gearbox with a gearbox housing, a rotor hub mounted outside of the gearbox and a satellite carrier in the gearbox housing, the satellite carrier having an input side and an output side. At the input side, the satellite carrier is only connected to the rotor hub and mounted in the gearbox housing without a bearing. At the output side, the satellite carrier is mounted in the gearbox housing via a torque bearing arranged in the gearbox housing on the output side of satellite carrier.

20 Claims, 6 Drawing Sheets

WIND ENERGY PLANT

CROSS-REFERENCE TO RELATED APPLICATIONS

This application is a divisional of application Ser. No. 12/041,138 filed Mar. 3, 2008, the entire contents of which are hereby incorporated by reference.

STATEMENT REGARDING FEDERALLY SPONSORED RESEARCH

Not applicable.

BACKGROUND OF THE INVENTION

The present invention is related to a wind energy plant, and in particular to the mounting of a satellite carrier in a gearbox of a wind energy plant.

From DE 103 57 026 B3, the entire contents of which is incorporated herein by reference, it is known to connect the rotor via a hollow rotor shaft with a single stage or multi-stage planetary gearing. The satellite carrier is mounted via two bearings in the housing of the gearbox. The bearings are therefore situated at the input side and at the output side of a hollow wheel which is fixedly arranged in the housing of the gearbox.

From U.S. Pat. No. 6,232,673, the entire contents of which is incorporated herein by reference, a wind energy plant is known, in which a dual reduction planetary gearing with an input stage and an output stage is provided. The satellite carrier of the input stage (the driving stage) is supported on the machine carrier or on the rotor carrier, respectively, and thus it acts as a torque support.

From EP 0 792 415 B, the entire contents of which is incorporated herein by reference, a planetary gearing for a wind energy plant is known in which a satellite carrier mounted in a gearbox housing is connected to a driving shaft. In this, the driving shaft or an end thereof, respectively, is mounted via the satellite carrier in the gearbox housing, wherein transversal forces charging the driving shaft are introduced into the gearbox housing via the bearings of the satellite carrier. The mounting of the satellite carrier takes place at the input side as well as on the output side of the satellites.

The present invention is based on the objective to provide a gearbox for a wind energy plant, in which a simple shaft-hub connection can be realized via the satellite carrier without additional construction elements.

BRIEF SUMMARY OF THE INVENTION

The present invention is related to a gearbox for a wind energy plant. The gearbox is realized as a single step or multi step planetary gearing, which has a satellite carrier. The satellite carrier is connected to a rotor hub at its input side and it is mounted via a bearing which is provided inside the gearbox housing for the satellite carrier. In this, the satellite carrier can be mounted in the gearbox housing, or the gearbox housing on the satellite carrier. According to the present invention, the bearing is arranged in the gearbox housing at the output side of the satellites of the satellite carrier. The position of the bearing for the satellite carrier at the output side offers a series of particular advantages. In a known satellite carrier, which is mounted at the input side and at the output side in the gearbox housing, the bearing at the input side must be provided with a large inner diameter, whereby the expense for the bearing is increased. Alternatively, a hub connection can also be used, which can transmit large torques on a small diameter. Such shaft-hub connections are sumptuous and require much space. For the rest, they are full of risks in production and assembly, which eventually increases the cost. According to the present invention, it is provided to use a compact torque bearing at the output side of the satellite carrier, which serves for receiving all the moments and transversal forces acting between satellite carrier and gearbox housing. As a particular advantage, through this arises also the possibility to be able to realise any arbitrary rotor-hub tying at the input side. A rotor hub connected to the satellite carrier mounted according to the present invention is mounted outside of the gearbox in a per se known manner.

Preferably, in the planetary gearing it is dealt with a multi-stage planetary gearing, wherein a satellite carrier of the first stage is provided as the satellite carrier which is mounted according to the present invention.

As the torque bearing, an adjusted pair of taper roller bearings can be provided in particular. Alternatively, it is also possible to provide a three-row cylindrical roller bearing as the torque bearing. In principle, other embodiments are also conceivable for the bearing, when the bearing provides a supporting moment with simultaneous axial and radial guiding.

In a preferred embodiment, an adaptor disc can be provided for directly tying the rotor hub to the satellite carrier.

In a purposeful embodiment, the adaptor disc is screwed together with the satellite carrier, wherein the rotor hub connected with the adaptor disc is mounted on a bearing structure via a torque bearing. As the bearing structure, the machine carrier might serve for instance, on which the gearbox is mounted also.

BRIEF DESCRIPTION OF THE SEVERAL VIEWS OF THE DRAWINGS

Preferred embodiments of the mounting according to the present invention are explained in more detail by means of examples of its realisation in the following.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
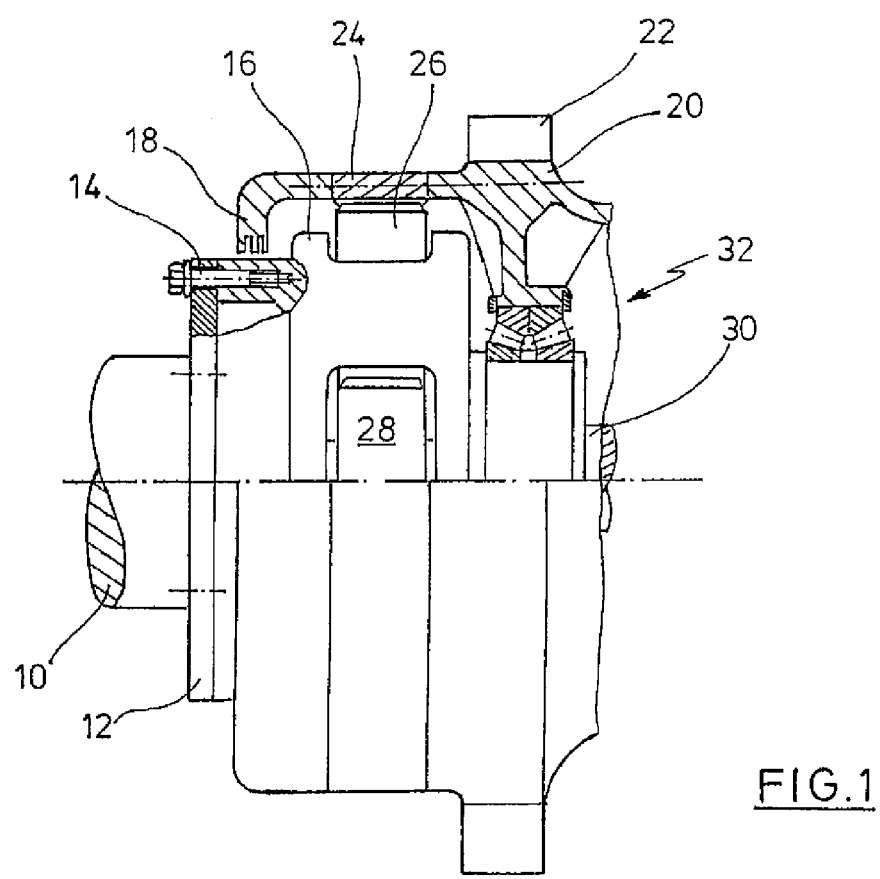
FIG. 1 shows a gearbox with a double-mounted rotor shaft, in a sectional view in detail.

FIG. 1 shows an embodiment alternative to the invention to explain the mounting according to the invention in comparison with the conventional mounting of a satellite carrier.

FIG. 1 shows a rotor shaft 10 in a section, which is double-mounted with a rotor bearing housing made of one piece or two pieces (not shown). The end of the rotor shaft 10 pointing into the gearbox has a rotor shaft flange 12, which is connected to the rotor shaft in positive fit. The rotor shaft flange 12 is connected with a satellite carrier 16 via a screw connection 14. The inner space of the gearbox is sealed against the surroundings via a schematically depicted sealing system 18. The gearbox realized as a multi-stage planetary gear has a gearbox housing 20 with a momentum support 22. The hollow wheel 24 integrated into the housing 20 and two of the satellites 26, 28 can also be recognized in FIG. 1. The sun shaft 30 leads to the sun (not shown) in the first stage of the gearbox.

The satellite carrier 16 is mounted in the housing 20 of the gearbox via a torque bearing 32. The torque bearing 32 is located on the output side of the satellite carrier 16, and in the depicted example of realisation it is realized as an adjusted pair of taper roller bearings.

Figure 5:
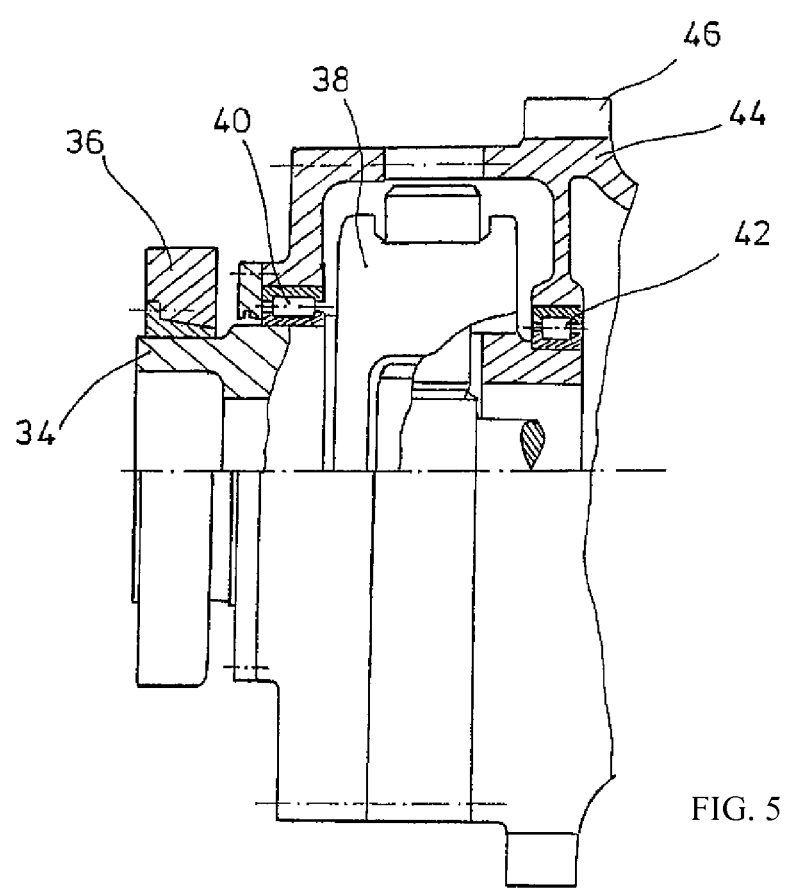
FIG. 5 shows the conventional mounting of the satellite carrier inside a gearbox for a wind energy plant.

The distinctive feature of the mounting according to the present invention becomes clear when it is compared with the conventional mounting of the satellite carrier depicted in FIG. 5. FIG. 5 shows a hollow shaft 34 on the satellite carrier, which is provided for connection with the rotor shaft via a shrink disc 36. At the input side, the satellite carrier 38 is mounted via a cylindrical roller bearing 40 in the housing 44, and at the output side via a further cylindrical roller bearing 42. The housing 44 is supported on the machine carrier by a moment support 46 via uncoupling elements (not shown), like the example depicted in FIG. 1. The two cylindrical roller bearings might also be substituted by two taper roller bearings in the X-arrangement, which are adjusted and have a supporting width for taking up the moments.

As shown in FIG. 5, in the mounting of the satellite carrier of the first stage for the gearbox of a wind energy plant, with a set-up gearbox the gearbox housing is mounted on the rotating satellite carrier in the state of the art (compare bearing 40, 42 in FIG. 5). Even further gearing stages (not shown in FIG. 5) are mounted indirectly on the satellite carrier in the gearbox housing with their bearing points via the bearings 40 and 42. This has the result that either bearings with great inner diameter have to be provided on the input side, or alternatively a shaft-hub connection has to be used, which can transmit great torques on a diameter as small as possible. Such shaft-hub connections are known in the state of the art, however they require much space and they are heavy. For the rest, they are sumptuous and full of risks in production and assembly, so that they must be classified as cost-intensive altogether.

FIG. 1 makes clear that using a compact torque bearing at the output side of the satellite carrier provides the possibility to realise any arbitrary tying of the rotor shaft at the input side. In this, the torque bearing receives the forces between satellite carrier and gearbox housing. In a further example of realisation still to be described below, in the realisation with a tooth coupling according to FIG. 2, the acting forces are predominantly the gravity forces of the satellite carrier. In a frictionally engaged connection between satellite carrier and rotor hub, the acting forces are the gravity forces of the remaining gearbox and the forces resulting from the deformation of the machine carrier under load.

Figure 2:
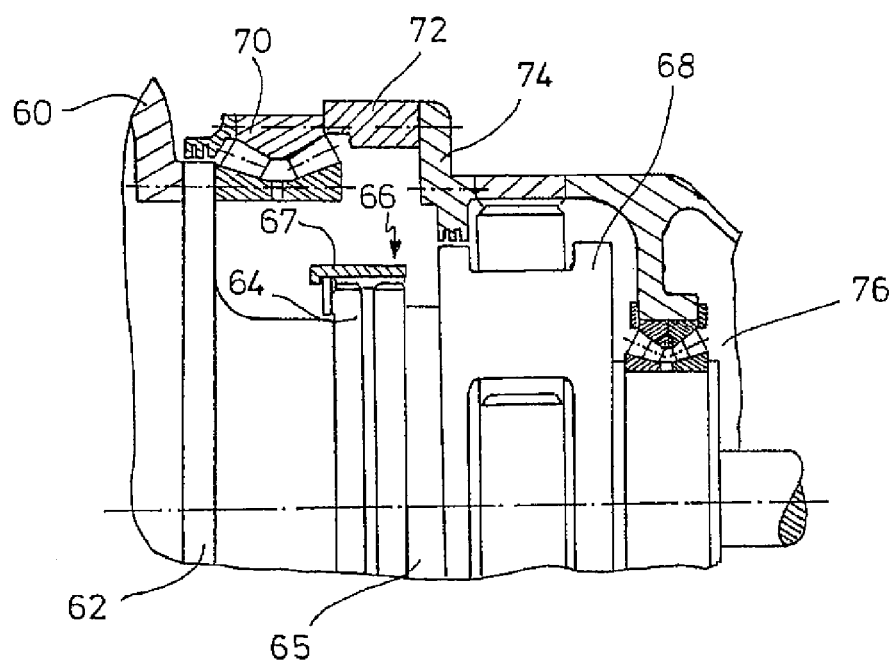
FIG. 2 shows a gearbox according to the present invention, the housing of which is screwed together with a machine carrier, wherein the mounting of the rotor hub takes also place via a torque bearing, in a sectional view in detail.

FIG. 2 shows a further example of realisation, in which the gearbox is fixedly screwed together with a bearing structure and the mounting of the rotor hub takes also place via a torque bearing. FIG. 2 shows a rotor hub 60, which is connected with an adaptor shaft 62. The adaptor shaft 62 has an outside-situated plug-in toothing 64 on its end pointing to the gearbox. The adaptor shaft 62 is coupled to the satellite carrier 68 via a tooth coupling 66. In the tooth coupling, a hub with plug-in toothing 64 and a further hub with plug-in toothing 65 engage into an inside toothed coupling sleeve 67. The rotor hub 60 is definedly mounted on the machine carrier 72 via a torque bearing 70. In the same way, the gearbox housing 74 is definedly mounted on the machine carrier 72, wherein a compensation of relative movements takes place via the tooth coupling 66. At its output side, the satellite carrier 68 is mounted on the gearbox housing 74 via a torque bearing 76. The rotor hub 60 and the adaptor 62 can be realized as one single piece. Optionally, the hub with plug-in toothing can be realized as one individual piece for easier production of the plug-in toothing, and be connected to the rotor hub 60, 62 via a connection with positive fit.

Figure 3:
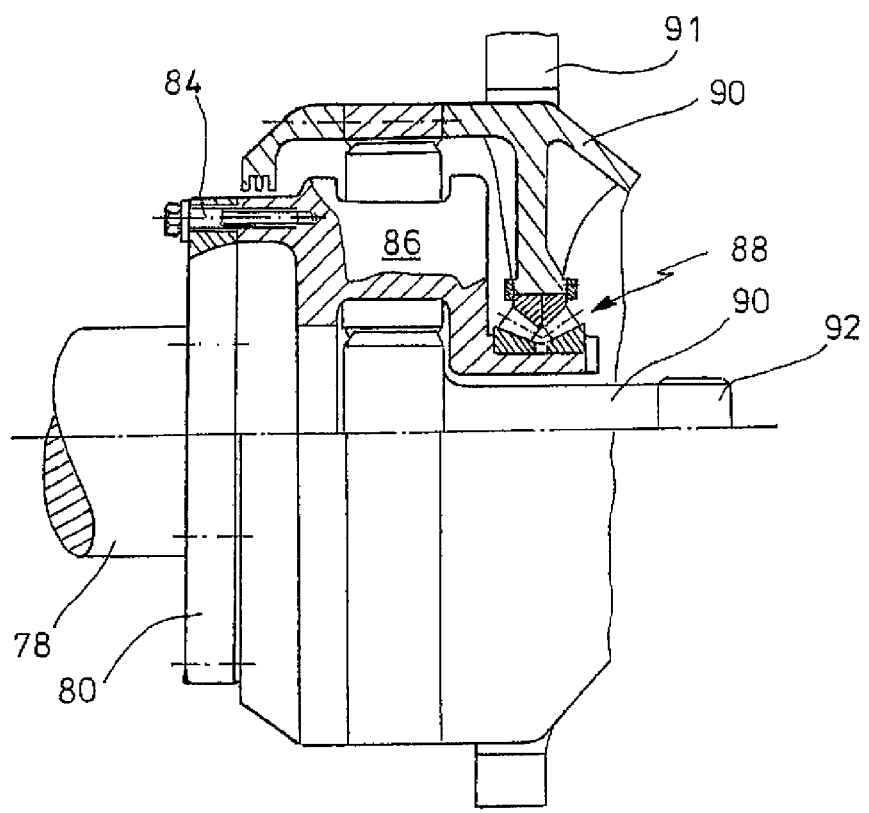
FIG. 3 shows a gearbox, in which the double-mounted rotor shaft is connected to the satellite carrier via a rotor shaft flange, in a sectional view in detail.

FIG. 3 shows an additional alternative embodiment, in which the gearbox is realised as a plug-in gearbox. Like in the plug-in gearbox of FIG. 1 already, the rotor shaft 78 is connected to the satellite carrier 86 via a rotor shaft flange 80 via a screw connection 84 through frictional/nonpositive engagement. The gearbox housing 90 and with it the entire gearbox is mounted on the satellite carrier 86 via a torque bearing 88. As can be clearly recognized in FIG. 3, when installing the gearbox, the sun 90 is plugged into the satellite carrier 86 at the input side, wherein the sun 90 has a plug-in toothing 92 for connection with the satellite carrier of the second stage. The gearbox housing 90 is supported via a torque support 91. Even in other examples of realisation of the invention, the sun can be inserted at the input side when the satellite carrier and the torque bearing have appropriate dimensions.

The examples of realisation of the invention put forward can be systematically summarised in the following table:

| Rotor mounting | Realisation of the satellite carrier with rotor hub | Tying of the gearbox to the machine carrier | |
|---|---|---|---|
| Torque bearing | Tooth coupling (plug-in toothing) | Fixedly screwed | Satellite carrier is mounted in the gearbox housing (FIG. 2) |
| | Frictional/nonpositive | Via torque support and uncoupling elements | Gearbox housing is mounted on the satellite carrier (FIG. 4) |

The first column concerns the rotor mounting, which is a torque mounting for the rotor hub.

The second column designates the connection between satellite carrier and rotor hub. Here, it is distinguished between a tooth coupling, which is realized as a plug-in toothing, and a friction/nonpositive connection, as can be produced by screwing for instance. In the third column, the tying of the gearbox to the machine carrier is represented. Here, it is distinguished between the gearbox fixedly screwed on the machine carrier and the supporting of the gearbox which is provided via a torque support and an uncoupling element. In the table, it can already be recognized clearly that in a fixedly screwed gearbox tying, the connection between the satellite carrier and rotor hub must take place via a tooth coupling. In the fourth column, the mounting relation of the satellite carrier to the gearbox housing and the figure which shows a corresponding embodiment is represented in short terms.

Figure 4:
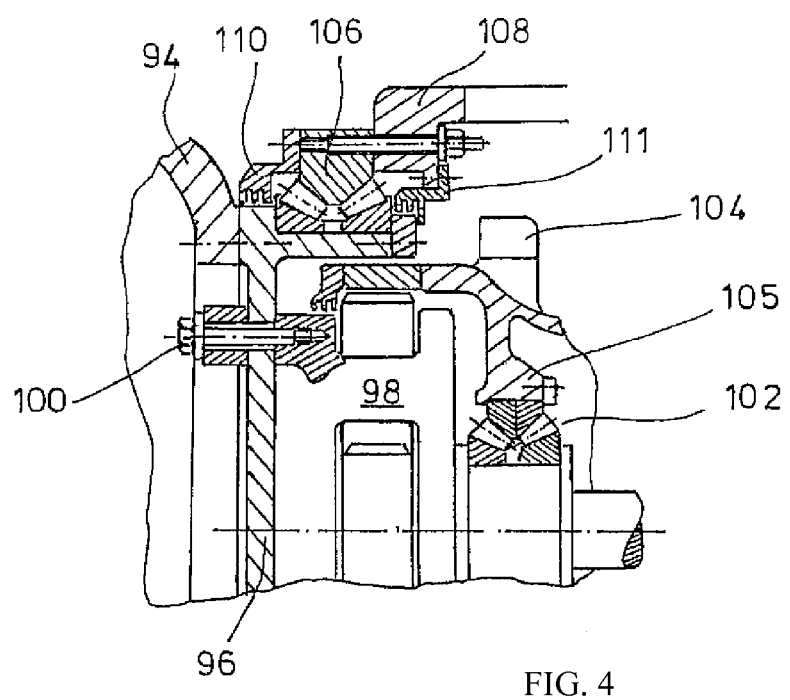
FIG. 4 shows a gearbox according to the present invention and a mounting of the rotor on a machine carrier via a torque bearing.

A further example of realisation of the invention is depicted in FIG. 4. In this, mounting of the rotor hub takes place via a torque bearing, like already in the example of realisation of FIG. 2. The rotor hub 94 is connected to the satellite carrier 98 via an adaptor disc 96. The connection takes place through frictional and nonpositive engagement via a screw joint 100. The gearbox housing 105 is mounted on the satellite carrier 98 via a torque bearing 102 and is supported on a torque support 104.

The rotor hub 94 is mounted directly on the machine carrier 108 via a second torque bearing 106 as a rotor bearing. The torque bearing 106 for mounting the rotor hub is sealed against external influences through a sealing system 110 and 111. The torque bearing 106 is located approximately in the region of the hollow wheel 112 of the first planetary stage. The rotor hub 94 and the adaptor disc 96 can be made in one piece.

Figure 6A:
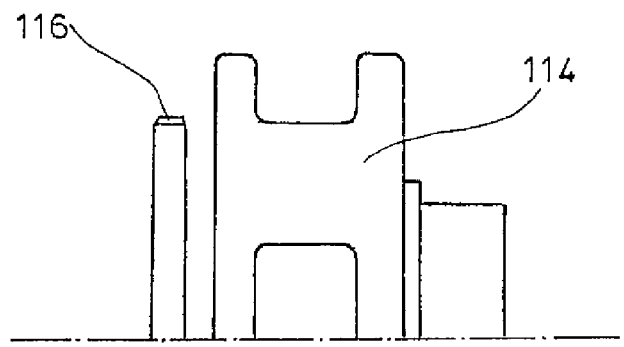
FIGS. 6A and 6b show two views in detail relating to differently realized satellite carriers.
Figure 6B:
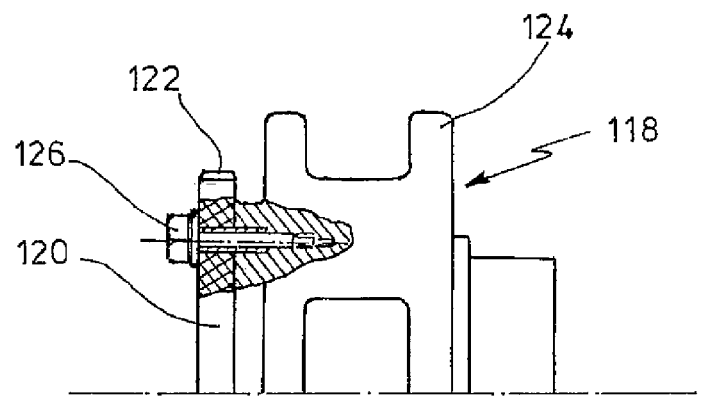

FIGS. 6a and 6b show two differently shaped satellite carriers 114 and 118 in detail views. The satellite carrier 114 is made in one piece and at its input side, it has a hub with a tooth coupling, which is provided with an exterior plug-in toothing. The satellite carrier 118 in FIG. 6b is made in two pieces, wherein the hub of a tooth coupling with exterior plug-in toothing is realized as a disc and is connected with the body 124 of the satellite carrier 118 via screws 126.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A wind energy plant comprising:
a gearbox with a gearbox housing;
a rotor hub mounted outside of the gearbox, and
a satellite carrier in the gearbox housing, the satellite carrier having an input side and an output side,
wherein at the input side, the satellite carrier is only connected to the rotor hub and mounted in the gearbox housing without a bearing,
and wherein at the output side, the satellite carrier is mounted in the gearbox housing via a torque bearing arranged in the gearbox housing on the output side of satellite carrier.

2. The wind energy plant of claim 1, wherein the torque bearing is capable of receiving all the moments and transversal forces acting between satellite carrier and gearbox housing.

3. The wind energy plant of claim 1, wherein the satellite carrier is a satellite carrier of the first stage in a multi-stage planetary gearing.

4. The wind energy plant of claim 1, wherein at least one tapered roller bearing is provided as the torque bearing.

5. The wind energy plant of claim 4, wherein an adjusted pair of tapered roller bearings is provided as the torque bearing.

6. The wind energy plant of claim 1, wherein a three-row cylindrical roller bearing is provided as the torque bearing.

7. The wind energy plant of claim 1, wherein a direct tying of the rotor hub to the satellite carrier takes place.

8. The wind energy plant of claim 1, wherein an adapter disc is provided for tying the rotor hub with the satellite carrier, wherein the adapter disc is connected to the satellite carrier.

9. The wind energy plant of claim 8, wherein the adapter disc is mounted on a bearing structure via a torque bearing as the rotor bearing.

10. The wind energy plant of claim 8, wherein the connection of the rotor hub to the satellite carrier via the adapter disc takes place through frictional and non-positive engagement via a screw joint.

11. The wind energy plant of claim 8, wherein the rotor hub and the adapter disc are made in one piece.

12. The wind energy plant of claim 1, wherein the rotor hub is mounted on a bearing structure via a torque bearing as the rotor bearing.

13. The wind energy plant of claim 1, wherein the rotor hub is connected with an adapter shaft, which is coupled to the satellite carrier.

14. The wind energy plant of claim 13, wherein the adapter shaft is coupled to the satellite carrier via a tooth coupling.

15. A wind energy plant comprising:
a gearbox and an assembly, the gearbox comprising a gearbox housing, the assembly comprising a rotor hub mounted outside of the gearbox and a satellite carrier arranged in the gearbox housing, the satellite carrier having an input and an output side, the satellite carrier connected at the input side only to the rotor hub and mounted at the input side in the gearbox housing without a bearing,
wherein the assembly is mounted in the gearbox housing with a bearing on the output side of the satellite carrier.

16. The wind energy plant of claim 15, wherein the satellite carrier is a satellite carrier of the first stage in a multi-stage planetary gearing.

17. The wind energy plant of claim 15, wherein at least one tapered roller bearing is provided as the bearing.

18. The wind energy plant of claim 17, wherein an adjusted pair of tapered roller bearings is provided as the bearing.

19. The wind energy plant of claim 15, wherein an adapter disc is provided for tying the rotor hub with the satellite carrier, wherein the adapter disc is connected to the satellite carrier.

20. The wind energy plant of claim 15, wherein the rotor hub is connected with an adapter shaft, which is coupled to the satellite carrier.

* * * * *